United States Patent Office 3,060,203
Patented Oct. 23, 1962

3,060,203
4-ANDROSTEN-3β,16β,17β-TRIOL AND ESTERS THEREOF
Max N. Huffman, Colorado Springs, Colo., assignor to Lasdon Foundation, Inc., Yonkers, N.Y., a corporation of Delaware
No Drawing. Filed June 6, 1960, Ser. No. 33,930
5 Claims. (Cl. 260—397.5)

This invention relates to 16β,17β-dihydroxy-4-androstene compounds containing a hydroxyl substituent in the 3-position. More particularly, this invention relates to novel steroids having the following generally structural formula and alkanoic acid esters thereof:

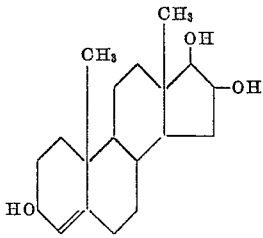

The compounds of this invention are novel steroids of the androstene series which are useful in stimulating beneficial phagocytic activity and velocity in mammals. These new steroids stimulate the removal of foreign particles in tussues by the phagocytes which are present in blood without exhibiting the undesirable androgenic properties shown by related androstene compounds. The change in structure of the steroids in this invention from the structure of the androgens significantly modifies the physiological properties thereof so as to remove the androgenic activity and render the compounds useful as phagocytic stimulants. These properties are unique in the androgen group of steroids and endow the compounds with a variety of useful activities which are of value in medicinal chemistry.

It is the object of this invention to provide new steroid compounds of the 4-androstene series. It is a further object of this invention to provide methods of producing such compounds efficiently from available sources of steroids. It is another object of this invention to provide new and useful 4-androstene compounds which stimulate the phagocytic velocity in mammals. A further object is to provide new steroids of the 4-androstene series which stimulate removal of foreign particles from tissues by the phagocytes without concurrent androgenic activity. These and other objects are apparent from and are achieved in accordance with the following description of the invention.

4-androsten-3β,16β,17β-triol, one of the novel steroids of this invention, can be produced from 4-androsten-16β,17β-diol-3-one through its known diacetate produced by conventional procedures. The keto group in the 3-position can be reduced to a 3β-hydroxy radical by reaction with an alkali metal hydride of a metal of group IIIa of the periodic table, such as sodium borohydride, in an inert solvent, thereby forming 4-androsten-3β,16β,17β-triol-16,17-diacetate. The latter can then be converted to the corresponding triacetate by treatment with acetic anhydride in pyridine or related tertiary amine solvents having a boiling point above about 100° C. The diacetate or the triacetate of 4-androsten-3β,16β,17β-triol can be hydrolyzed to 4-androsten-3β,16β,17β-triol by reaction with alkali in an organic solvent, such as methanolic potassium hydroxide.

In the foregoing procedures other esters can be used rather than esters of acetic acid. For instance, 4-androsten-16β,17β-diol-3-one can be converted into other esters of aliphatic acids, such as the dipropionate, and reduced with other alkali metal hydrides of metals of group IIIa of the periodic table, such at lithium borohydride, sodium aluminum hydride and the like, in inert solvents, such as methanol, ethanol, ethyl acetate, dioxane and the like. The product thus obtained is a 4-androsten-3β,16β,17β-triol ester of an aliphatic acid, such as propionic or butyric acid. The latter can be hydrolyzed to a 4-androsten-3β,16β,17β-triol and the latter can be converted into triesters of aliphatic acids, such as acetic, propionic, butyric, stearic, oleic, palmitic, myristic and the like, which esters are useful for medicinal purposes.

The invention is disclosed in further detail by the following examples which are provided solely for the purposes of illustration and not intended to limit the invention in scope. Quantities of materials are indicated in grams and milligrams (mg.) and volumes are indicated in milliliters (ml.) while temperatures are recorded in degrees centigrade. It will be understood by those skilled in the art that numerous modifications in operating conditions and equivalent materials can be made within the scope of this disclosure without departing from this invention.

*Example 1*

4-androsten-3β,16β,17β-triol from 4-androsten-16β,17β-diol-3-one diacetate.—3.0 grams of 4-androsten-16β,17β-diol-3-one diacetate (M.P. 192–194° C.) in 150 ml. of absolute ethanol and 150 ml. of ethyl acetate was reduced with 2.4 grams of sodium borohydride at 0° C. over a period of three hours, followed by one hour at room temperature. One liter of cold 5% sodium chloride solution containing ice and 35 ml. of acetone was added. After 15 minutes 2.5 liters of cold 5% sodium chloride solution was added and the mixture was refrigerated over night. A precipitate of 4-androsten-3β,16β,17β-triol-16,17-diacetate amounting to 2.58 grams formed and was collected on a filter and dried. After purification with acetone and petroleum ether the product melted at 179–180° C.

4-androsten-3β,16β,17β-triol-16,17-diacetate was acetylated in the 3-position by treatment of 1.3 grams of the diacetate in 12 ml. of dry pyridine with 12 ml. of acetic anhydride at room temperature. The reaction mixture was diluted with 450 ml. of water and a precipitate of 4-androsten-3β,16β,17β-triol triacetate weighing 1.05 grams was formed. This product was separated and recrystallized from 80% methanol. 4-androsten-3β,16β,17β-triol triacetate melted at 140–141° C.

980 mg. of 4-androsten-3β,16β,17β-triol triacetate dissolved in 30 ml. of 0.5 N absolute methanolic potassium hydroxide solution was allowed to stand for 24 hours at room temperature. The mixture was diluted with 350 ml. of ice water containing 1.0 ml. acetic acid and refrigerated at 0° C. A precipitate of 4-androsten-3β,16β,17β-triol amounting to 620 mg. was collected on a filter. It melted at 192–194° C.

What is claimed as new and is desired to be secured by Letters Patent of the United States is:

1. A steroid of the formula

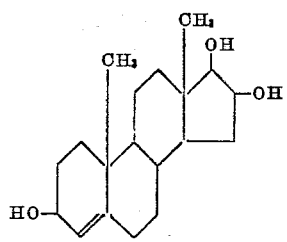

and 16,17-diesters and 3,16,17-triesters thereof with aliphatic carboxylic acids containing 1 to 18 carbon atoms.

2. 4-androsten-3β,16β,17β-triol.
3. 4-androsten-3β,16β,17β-triol triacetate.
4. 4-androsten-3β,16β,17β-triol-16,17-diacetate.
5. A member of the group consisting of 16,17-diesters and 3,16,17-triesters of 4-androsten-3β,16β,17β-triol with an aliphatic carboxylic acid containing 1 to 18 carbon atoms.

References Cited in the file of this patent
Elishberg et al.: J.A.C.S., June 5, 1952, pages 2814–16.